US011531865B2

(12) United States Patent
McGill, Jr. et al.

(10) Patent No.: US 11,531,865 B2
(45) Date of Patent: Dec. 20, 2022

(54) SYSTEMS AND METHODS FOR PARALLEL AUTONOMY OF A VEHICLE

(71) Applicant: Toyota Research Institute, Inc., Los Altos, CA (US)

(72) Inventors: Stephen G. McGill, Jr., Broomall, PA (US); Guy Rosman, Newton, MA (US); Luke S. Fletcher, Cambridge, MA (US); John Joseph Leonard, Newton, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 380 days.

(21) Appl. No.: 16/805,218

(22) Filed: Feb. 28, 2020

(65) Prior Publication Data
US 2021/0269051 A1    Sep. 2, 2021

(51) Int. Cl.
*G06N 3/04* (2006.01)
*B60W 50/14* (2020.01)
(Continued)

(52) U.S. Cl.
CPC .......... *G06N 3/0454* (2013.01); *B60W 50/14* (2013.01); *B60W 60/0011* (2020.02); *B60W 60/0015* (2020.02); *B60W 60/0025* (2020.02); *G06N 3/08* (2013.01); *H04L 12/40* (2013.01); *H04L 2012/40215* (2013.01)

(58) Field of Classification Search
CPC ....... G06N 6/0454; G06N 3/08; B60W 50/14; B60W 60/0011; B60W 60/0015; B60W 60/0025; H04L 12/40; H04L 2012/40215
See application file for complete search history.

(56) References Cited

U.S. PATENT DOCUMENTS 10,981,564 B2 *    4/2021 Herman ................. G08G 1/166
2018/0154899 A1 *  6/2018 Tiwari .................. G05D 1/0217
(Continued)

FOREIGN PATENT DOCUMENTS

WO    WO-2021089570 A1 *  5/2021 ............. G06N 20/20

OTHER PUBLICATIONS

Huang et al., "Uncertainty-Aware Driver Trajectory Prediction at Urban Intersections," Mar. 6, 2019, found at https://arxiv.org/pdf/1901.05105.pdf (8 pages).
(Continued)

*Primary Examiner* — Dale W Hilgendorf
(74) *Attorney, Agent, or Firm* — Christopher G. Darrow; Darrow Mustafa PC (57) ABSTRACT

Systems and methods for parallel autonomy of a vehicle are disclosed herein. One embodiment receives input data, the input data including at least one of sensor data and structured input data; encodes the input data into an intermediate embedding space using a first neural network; inputs the intermediate embedding space to a first behavior model and a second behavior model, the first behavior model producing a first behavior output, the second behavior model producing a second behavior output; combines the first behavior output and the second behavior output using an ideal-behavior model to produce an ideal behavior for the vehicle; and controls one or more aspects of operation of the vehicle based, at least in part, on the ideal behavior.

20 Claims, 4 Drawing Sheets

(51) Int. Cl.
*B60W 60/00* (2020.01)
*G06N 3/08* (2006.01)
*H04L 12/40* (2006.01)

(56) References Cited

U.S. PATENT DOCUMENTS

| | | | |
|---|---|---|---|
| 2018/0260706 A1* | 9/2018 | Galloway | G06N 3/08 |
| 2018/0330178 A1* | 11/2018 | el Kaliouby | G06K 9/627 |
| 2019/0009794 A1 | 1/2019 | Toyoda et al. | |
| 2020/0023846 A1* | 1/2020 | Husain | H04W 4/027 |
| 2020/0134442 A1* | 4/2020 | Sim | G06Q 10/06311 |
| 2020/0151222 A1* | 5/2020 | Mannar | G06F 16/355 |
| 2020/0175691 A1* | 6/2020 | Zhang | G05B 13/027 |
| 2020/0356835 A1* | 11/2020 | Robinson | B60W 40/09 |
| 2020/0379454 A1* | 12/2020 | Trinh | G06N 3/088 |
| 2021/0049452 A1* | 2/2021 | Fan | G06N 3/08 |
| 2021/0053569 A1* | 2/2021 | Censi | B60W 30/18163 |
| 2021/0248514 A1* | 8/2021 | Celia | G06Q 30/0278 |
| 2021/0294323 A1* | 9/2021 | Bentahar | B60W 50/00 |
| 2021/0342686 A1* | 11/2021 | Kothari | G06N 3/0445 |
| 2021/0370962 A1* | 12/2021 | Zhu | B60W 50/085 |
| 2022/0126863 A1* | 4/2022 | Moustafa | H04L 9/3213 |

OTHER PUBLICATIONS

Schwarting et al., "Safe Nonlinear Trajectory Generation for Parallel Autonomy with a Dynamic Vehicle Model," IEEE Transactions On Intelligent Transportation Systems, Oct. 2017, found at https://pure.tudelft.nl/portal/files/37853894/journal_pa_mpc_8_.pdf (16 pages).

Anderson et al., "Experimental Performance Analysis of a Homotopy-Based Shared Autonomy Framework," IEEE Transactions on Human-Machine Systems, vol. 44, No. 2, Apr. 2014, found at https://ieeexplore.IEEE.org/abstract/document/6766255 (10 pages).

Fridman, "Human-Centered Autonomous Vehicle Systems: Principles of Effective Shared Autonomy," Oct. 3, 2018, found at https://arxiv.org/pdf/1810.01835.pdf (9 pages).

Khojasteh et al., "An Intelligent Safety System for Human-Centered Semi-Autonomous Vehicles," Feb. 20, 2019, found at https://arxiv.org/pdf/1812.03953.pdf (15 pages).

McGill, "Probabilistic Risk Metrics for Navigating Occluded Intersections," IEEE Robotics and Automation Letters, Jul. 2019, found at http://people.csail.mit.edu/rosman/papers/mcgill2019ral.pdf (8 pages).

* cited by examiner

SYSTEMS AND METHODS FOR PARALLEL AUTONOMY OF A VEHICLE

TECHNICAL FIELD

The subject matter described herein generally relates to vehicles and, more particularly, to systems and methods for parallel autonomy of a vehicle.

BACKGROUND

Some vehicles are designed to be driven manually but are equipped with an advanced driver-assistance system (ADAS) or other incident-avoidance system. Such a system can intervene by temporarily taking control of the steering system, the accelerator, and/or the braking system of the vehicle to prevent a potentially hazardous outcome (e.g., a collision). Unfortunately, the intervention can sometimes cause the driver to experience discomfort because the driver does not feel that he or she is in control of the vehicle.

SUMMARY

An example of a system for parallel autonomy of a vehicle is presented herein. The system comprises one or more sensors, one or more processors, and a memory communicably coupled to the one or more processors. The memory stores a data encoding module including instructions that when executed by the one or more processors cause the one or more processors to receive input data, the input data including at least one of sensor data from the one or more sensors and structured input data. The data encoding module also includes instructions that when executed by the one or more processors cause the one or more processors to encode the input data into an intermediate embedding space using a first neural network. The memory also stores a first behavior module including instructions that when executed by the one or more processors cause the one or more processors to process the intermediate embedding space using a first behavior model to produce a first behavior output. The memory also stores a second behavior module including instructions that when executed by the one or more processors cause the one or more processors to process the intermediate embedding space using a second behavior model to produce a second behavior output. The memory also stores an ideal-behavior model including instructions that when executed by the one or more processors cause the one or more processors to combine the first behavior output and the second behavior output using an ideal-behavior model to produce an ideal behavior for the vehicle. The memory also stores a control module including instructions that when executed by the one or more processors cause the one or more processors to control one or more aspects of operation of the vehicle based, at least in part, on the ideal behavior.

Another embodiment is a non-transitory computer-readable medium for parallel autonomy of a vehicle and storing instructions that when executed by one or more processors cause the one or more processors to receive input data, the input data including at least one of sensor data and structured input data. The instructions also cause the one or more processors to encode the input data into an intermediate embedding space using a first neural network. The instructions also cause the one or more processors to input the intermediate embedding space to a first behavior model and a second behavior model, the first behavior model producing a first behavior output, the second behavior model producing a second behavior output. The instructions also cause the one or more processors to combine the first behavior output and the second behavior output using an ideal-behavior model to produce an ideal behavior for the vehicle. The instructions also cause the one or more processors to control one or more aspects of operation of the vehicle based, at least in part, on the ideal behavior.

In another embodiment, a method of parallel autonomy of a vehicle is disclosed. The method comprises receiving input data, the input data including at least one of sensor data and structured input data. The method also includes encoding the input data into an intermediate embedding space using a first neural network. The method also includes inputting the intermediate embedding space to a first behavior model and a second behavior model, the first behavior model producing a first behavior output, the second behavior model producing a second behavior output. The method also includes combining the first behavior output and the second behavior output using an ideal-behavior model to produce an ideal behavior for the vehicle. The method also includes controlling one or more aspects of operation of the vehicle based, at least in part, on the ideal behavior.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

One set of embodiments described herein is directed to training and implementing a parallel autonomy system for a vehicle to perform interventions that are a fusion of both planned behaviors generated by an autonomous-behavior model and intended (predicted) behaviors of a driver generated by a driver-behavior model. The system is trained such that the intervention is a balance between a behavior that is faithful to the driver's predicted behavior and a behavior that poses a minimal risk of an incident (e.g., a collision). Accordingly, the system can perform an intervention that incorporates at least some aspects of the driver's predicted behavior. Additionally, such aspects of the intended behavior may be gradually incorporated into the intervention or gradually separated from the intervention over time in response to factors such as feedback from the driver.

Another set of embodiments described herein is directed to training and implementing a parallel autonomy system for a vehicle to fuse two different planned behaviors from two different autonomous-behavior models to achieve predetermined objectives for the fused behavior that is ultimately used to control the vehicle in an autonomous-driving context.

In both sets of embodiments mentioned above, during both a training phase and an on-line operational phase, a first neural network encodes vehicle sensor data and/or structured input data into an intermediate embedding space. During the training phase, a second neural network decodes the data in the intermediate embedding space and predicts the input sensor data and/or the structured input data input to the first neural network. During training, a loss function may calculate a loss between the input provided to the first neural network and the predicted input generated by the second neural network. This loss may then be used to train the first and second neural networks such that subsequently calculated losses between the input(s) provided to the first neural network and the predicted input(s) generated by the second neural network decrease over time.

In the first set of embodiments mentioned above, during the on-line operational phase, the intermediate embedding space is processed by both an autonomous-behavior model and a driver-behavior model. The autonomous-behavior model outputs a planned behavior for the vehicle and an associated autonomous-model risk. The driver-behavior model outputs a predicted behavior for the vehicle (a prediction of what the human driver intends to do) and an associated driver-model risk. The planned behavior, autonomous-model risk, predicted behavior, and driver-model risk are input to an ideal-behavior model, which combines the planned behavior and the predicted behavior to output an ideal behavior and an associated ideal-model risk. This ideal behavior, at least in part, can be used to control one or more aspects of the operation of the vehicle such as steering, acceleration, and/or braking. As mentioned above, in a different set of embodiments, the system, in an autonomous-driving context, combines two different planned behaviors from two different autonomous-behavior models to generate the ideal behavior executed by the vehicle. Both sets of embodiments mentioned above are discussed further below.

Figure 1:
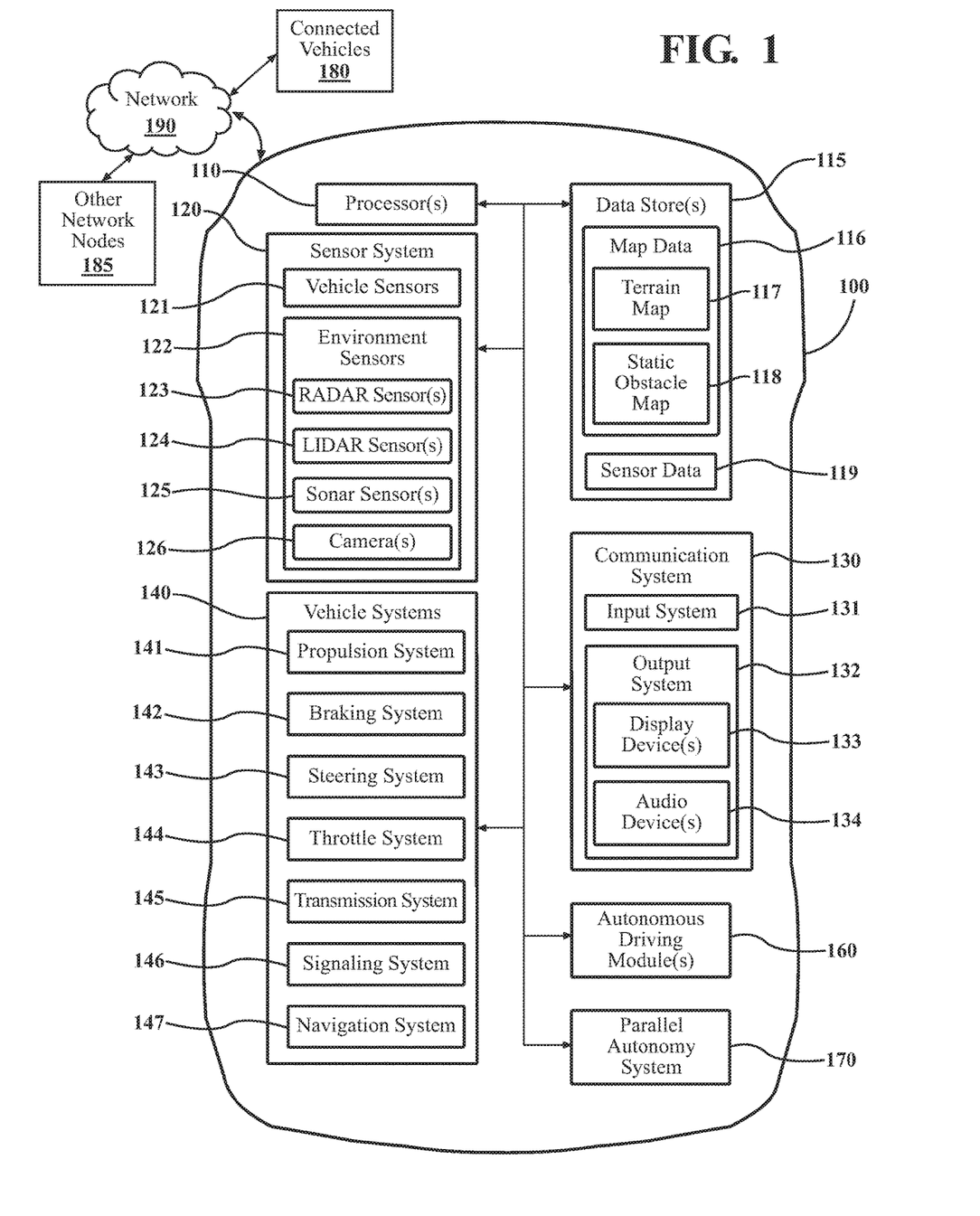
FIG. 1 illustrates one embodiment of a vehicle within which systems and methods disclosed herein may be implemented.

Referring to FIG. 1, an example of a vehicle 100, in which systems and methods disclosed herein can be implemented, is illustrated. The vehicle 100 can include a parallel autonomy system 170 or components and/or modules thereof. As used herein, a "vehicle" is any form of motorized transport. In one or more implementations, the vehicle 100 can be an automobile. In some implementations, the vehicle 100 may be any other form of motorized transport. In various embodiments, vehicle 100 is capable of operating in a semi-autonomous (parallel autonomy) or fully autonomous mode. The vehicle 100 can include the parallel autonomy system 170 or capabilities to support or interact with the parallel autonomy system 170 and thus benefits from the functionality discussed herein. While arrangements will be described herein with respect to automobiles, it will be understood that implementations are not limited to automobiles. Instead, implementations of the principles discussed herein can be applied to any kind of vehicle, as discussed above. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including parallel autonomy system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 may communicate with one or more connected vehicles 180 (e.g., via direct vehicle-to-vehicle communication) and one or more other network nodes 185 (cloud servers, infrastructure systems, etc.) via network 190.

Some of the possible elements of the vehicle 100 are shown in FIG. 1 and will be described in connection with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 can include radar sensor(s) 123, Light Detection and Ranging (LIDAR) sensor(s) 124, sonar sensor(s) 125, and camera(s) 126.

Figure 2:
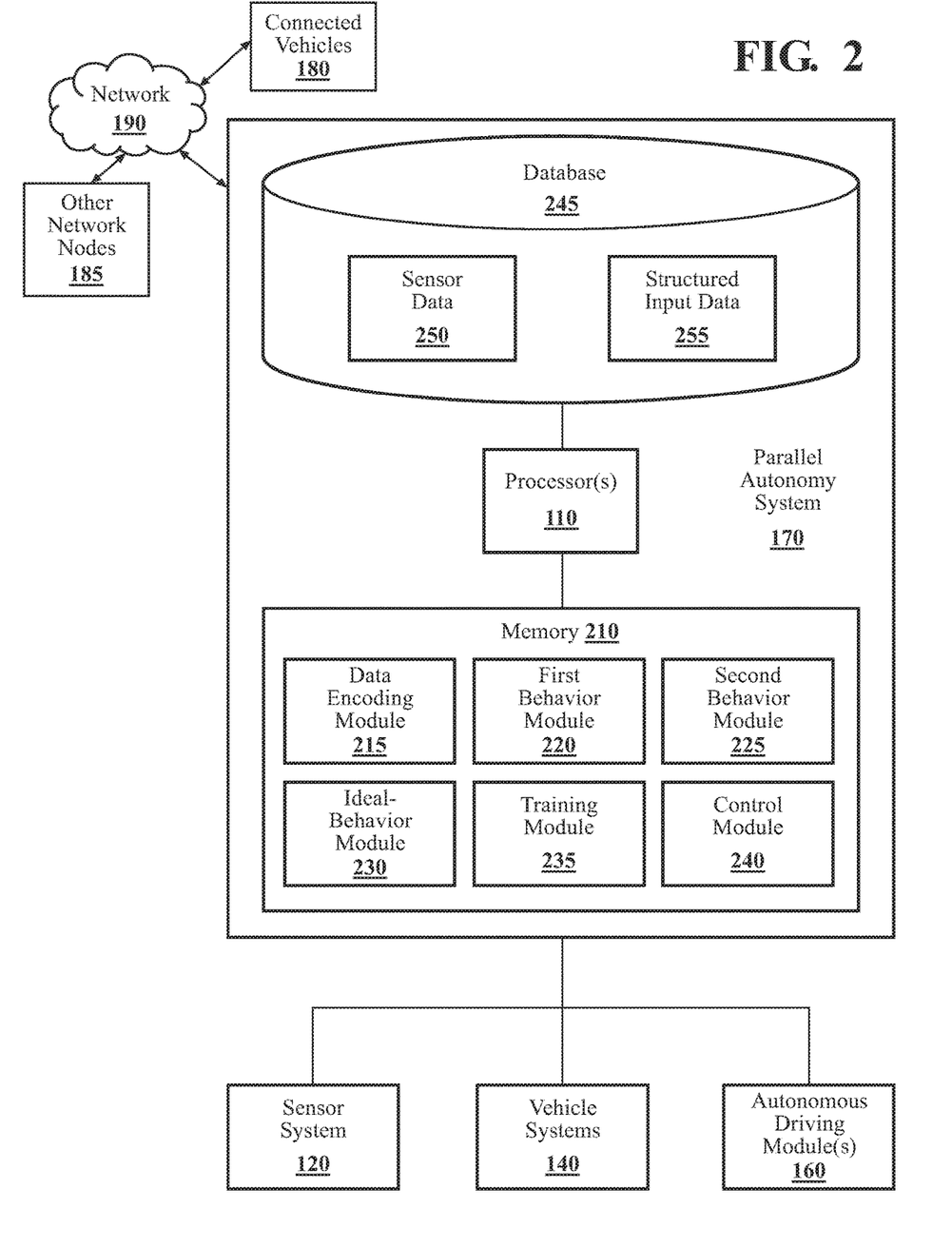
FIG. 2 illustrates one embodiment of a parallel autonomy system for a vehicle.

Referring to FIG. 2, one embodiment of the parallel autonomy system 170 of FIG. 1 is further illustrated. In this embodiment, parallel autonomy system 170 is shown as including one or more processors 110 from the vehicle 100 of FIG. 1. In general, the one or more processors 110 may be a part of parallel autonomy system 170, parallel autonomy system 170 may include one or more separate processors from the one or more processors 110 of the vehicle 100, or parallel autonomy system 170 may access the one or more processors 110 through a data bus or another communication path, depending on the embodiment.

In one embodiment, memory 210 stores a data encoding module 215, a first behavior module 220, a second behavior module 225, an ideal-behavior module 230, a training module 235, and a control module 240. The memory 210 is a random-access memory (RAM), read-only memory (ROM), a hard-disk drive, a flash memory, or other suitable memory for storing the modules 215, 220, 225, 230, 235, and 240. The modules 215, 220, 225, 230, 235, and 240 are, for example, computer-readable instructions that when executed by the one or more processors 110, cause the one or more processors 110 to perform the various functions disclosed herein.

As shown in FIG. 2, parallel autonomy system 170 can communicate with one or more connected vehicles 180 and one or more other network nodes 185 (e.g., cloud servers, infrastructure systems, etc.) via network 190. In communicating with connected vehicles 180, parallel autonomy system 170 can employ technologies such as dedicated short-range communication (DSRC) or BLUETOOTH® Low Energy (BLE) for direct vehicle-to-vehicle (V2V) communication. In communicating with cloud servers or infrastructure systems (traffic signals, roadside units, etc.), parallel autonomy system 170 can employ a technology such as cellular data. As shown in FIG. 2, in addition to interfacing with sensor system 120, parallel autonomy system 170 can also interface with one or more vehicle systems 140 (steering, braking, propulsion, etc.) and with autonomous driving module(s) 160, in some embodiments.

In some embodiments, parallel autonomy system 170 stores sensor data 250 output by sensor system 120 in a database 245. As discussed above, such sensor data 250 can include one or more of image data from camera(s) 126, radar data from radar sensor(s) 123, and LIDAR point-cloud data from LIDAR sensor(s) 124. In some embodiments, parallel autonomy system 170 also stores a variety of different kinds of structured input data 255. Such structured input data 255 can include, for example, position data and trajectories for one or more road agents (other vehicles, motorcycles, bicycles, scooters, pedestrians, etc.), information about the lane geometries of one or more roadways (e.g., map data 116), and intermediate output data from a perception pipeline of vehicle 100 (e.g., image-segmentation data from object detection and recognition processes). In some embodiments, parallel autonomy system 170 receives at least some structured input data 255 from sources external to vehicle 100. Those external sources can include, for example, cloud servers, infrastructure systems, and/or other vehicles (e.g., connected vehicles 180).

Data encoding module 215 generally includes instructions that cause the one or more processors 110 to receive input data including sensor data 250 from one or more sensors in sensor system 120, structured input data 255, or both. As discussed above, the structured input data 255 can be obtained from a perception pipeline of vehicle 100 itself, from external sources, or both. Data encoding module 215 also includes instructions to encode the input data into an intermediate embedding space using a first neural network. In some embodiments, the first neural network is an encoder network of an autoencoder. In one embodiment, the autoencoder is a variational autoencoder. The intermediate embedding space provides for efficient, low-dimensionality representation (e.g., vectors or two-dimensional matrices) of a large amount of input data analyzed by parallel autonomy system 170 in making decisions. As discussed further below, during an off-line training phase, training module 235 jointly trains the first neural network and a related second neural network—a decoder network of an autoencoder, in some embodiments—that is trained to predict the input data fed to the first neural network (the encoder network).

First behavior module 220 generally includes instructions that cause the one or more processors 110 to process the intermediate embedding space using a first behavior model to produce a first behavior output. In some embodiments, the first behavior model is an autonomous-behavior model, and the first behavior output is a planned behavior for vehicle 100 that can be executed autonomously via autonomous driving module(s) 160. A planned behavior can include one or more maneuvers involving the steering, acceleration, and/or braking of vehicle 100. In some embodiments, first behavior module 220 also outputs an associated autonomous-model risk—an estimate of the risk associated with executing the planned behavior.

Second behavior module 225 generally includes instructions that cause the one or more processors 110 to process the intermediate embedding space using a second behavior model to produce a second behavior output. In some embodiments, the second behavior model is a driver-behavior model that predicts the future intended behavior (e.g., steering, acceleration, and/or braking maneuvers) of vehicle 100, as controlled by a human driver. In those embodiments, the second behavior output is thus the predicted future behavior of vehicle 100. In other words, the second behavior output is a prediction of what the human driver controlling vehicle 100 is going to do in controlling vehicle 100 in the near future. In one embodiment, the predicted behavior of vehicle 100 extends to a time horizon of a few seconds. In some embodiments, second behavior module 220 also outputs an associated driver-model risk—an estimate of the risk associated with executing the predicted behavior of vehicle 100, as controlled by the human driver. The design of the driver-behavior model can vary, depending on the embodiment. In some embodiments, machine-learning techniques are employed to predict the future trajectory of vehicle 100, as controlled by the human driver. In other embodiments, a physics-based model can be employed. In still other embodiments, one or more machine-learning-based models are combined with one or more physics-based models (e.g., a mixture-of-experts architecture).

In other embodiments, the second behavior model, like the first behavior model, is an autonomous-behavior model, and the second behavior output is a planned behavior for vehicle 100 that is different from that produced by the first behavior model (the other autonomous-behavior model). In these embodiments, the two autonomous-behavior models can be designed in accordance with different policies or strategies, and the different planned behaviors produced by the two different autonomous-behavior models can be fused (blended) into an ideal behavior by ideal-behavior module 230 in accordance with predetermined optimization criteria. The resulting ideal behavior can then be used to control vehicle 100 in an autonomous-driving context. In an embodiment in which the outputs of two autonomous-behavior models are combined to generate the ideal behavior, each autonomous-behavior model can also output an autonomous-model risk associated with the planned behavior output by that model.

Ideal-behavior module 230 generally includes instructions that cause the one or more processors 110 to combine the first behavior output and the second behavior output using an ideal-behavior model to produce an ideal behavior that is ultimately used to control one or more aspects of the operation of vehicle 100 (e.g., steering, acceleration, and/or braking). The architecture of ideal-behavior module 230 can vary, depending on the particular embodiment. In some embodiments, ideal-behavior module 230 includes a support vector machine (SVM). In another embodiment, ideal-behavior module 230 includes a regressive neural network (RNN). In still other embodiments, ideal-behavior module 230 includes a reinforcement-learning model. In some embodiments, ideal-behavior module 230, in addition to outputting an ideal behavior, outputs an associated ideal-model risk—an estimate of the risk associated with vehicle 100 executing the ideal behavior.

In some embodiments, ideal-behavior module 230 balances two factors in combining an autonomous-model planned behavior with a predicted behavior associated with a human driver, factors which, at times, may conflict with each other: (1) An ideal behavior more similar to the driver's predicted (intended) behavior is more comfortable for the driver and is thus preferable to an ideal behavior less similar to the intended behavior; and (2) An ideal behavior posing a lesser risk of a traffic incident is preferable to an ideal behavior posing a greater risk of a traffic incident. As an example, if the risk posed by carrying out the driver's predicted behavior is equal to (or only slightly more than) the risk posed by carrying out the planned behavior, the ideal behavior could take the form of the predicted (intended) behavior. That is, no fusion would be necessary. However, the risk posed by carrying out the predicted behavior is generally greater than the risk posed by carrying out the planned behavior, though the difference between these risks can vary greatly, depending on the situation. If the risk posed by carrying out the predicted behavior is moderately greater than the risk posed by carrying out the planned behavior, then the ideal behavior can be a generally-balanced fusion of the planned behavior and the predicted behavior. On the other hand, if the risk posed by carrying out the predicted behavior is significantly greater than the risk posed by carrying out the planned behavior, the ideal behavior can be a fusion of primarily the planned behavior, with only a small contribution by the predicted behavior.

Subsequent ideal behaviors generated by ideal-behavior module 230 could reflect a smooth transition between predicted behaviors and planned behaviors (and vice versa) as the balance between the predicted and planned behaviors changes over time in response to, for example, driver feedback. Thus, in some embodiments, ideal-behavior module 230 includes instructions to update the ideal-behavior model over time in accordance with driver feedback or other factors. In one embodiment, the ideal-behavior model is trained, during a training phase, to generate an ideal behavior that reflects a balance between the two factors listed above. For example, in some embodiments, a loss function may be used during training to calculate a loss that reflects a difference (or similarity) between the predicted behavior and the ideal behavior. The calculated loss may also reflect a difference (or similarity) between the risk posed by carrying out the predicted behavior and the ideal behavior.

Training module 235 generally includes instructions that cause the one or more processors 110 to train various neural networks included in parallel autonomy system 170. In some embodiments, training module 235 jointly trains the first neural network (encoder network) and the second neural network (decoder network) in an autoencoder-based architecture, as discussed above. That is, training module 235 jointly trains the encoder and decoder neural networks of the autoencoder, the encoder network (the first neural network) being trained to encode input data into an intermediate embedding space, the decoder network (the second neural network) being trained to predict the input data that is fed to the encoder network. During the training phase, a loss function may calculate a loss between the input data provided to the first neural network (the encoder network) and the predicted input generated by the second neural network (the decoder network). This loss may then be used to train the first and second neural networks such that subsequently calculated losses between the input(s) provided to the first neural network and the predicted input(s) generated by the second neural network decrease over time.

Another aspect of training module 235 is the training of the ideal-behavior model associated with ideal-behavior module 230 during the training phase. As discussed above, in some embodiments, training module 235 may use a loss function during the training phase to calculate a loss that reflects a difference (or similarity) between the predicted behavior of vehicle 100 and the ideal behavior. In one embodiment, training module 235 seeks to minimize this predetermined loss function. The calculated loss may also reflect a difference (or similarity) between the risk posed by carrying out the predicted behavior and the ideal behavior. In other embodiments in which the first and second behavior models are both autonomous-behavior models, training module 235 can employ a loss function in training the ideal-behavior model to combine the two different planned behaviors in a manner that satisfies predetermined optimization criteria for the output ideal behavior.

In some embodiments, training module 235 and other components (e.g., the second neural network and one or more loss functions associated with training the ideal-behavior model) are separate from vehicle 100, and the off-line training phase described herein is performed by a computing system that is separate from vehicle 100 (e.g., at a vehicle manufacturer's research and development facility). In these embodiments, the trained first and second neural networks, the trained ideal-behavior model, and other data and program code associated with parallel autonomy system 170 can be downloaded to a vehicle 100 via network 190. In other embodiments, vehicle 100 includes all of the components (e.g., training module 235, etc.) necessary to perform the off-line training phase from the vehicle 100 itself.

Control module 240 generally includes instructions that cause the one or more processors 110 to control one or more aspects of the operation of vehicle 100 based, at least in part, on the ideal behavior generated by ideal-behavior module 230. As discussed above, the one or more aspects of the operation of vehicle 100 can include, for example, steering, acceleration, and/or braking. In some embodiments, this control can be exercised through control module 240 interfacing with autonomous driving module(s) 160, which, in turn, controls the various vehicle systems 140 of vehicle 100 (refer to FIG. 1).

Figure 3:
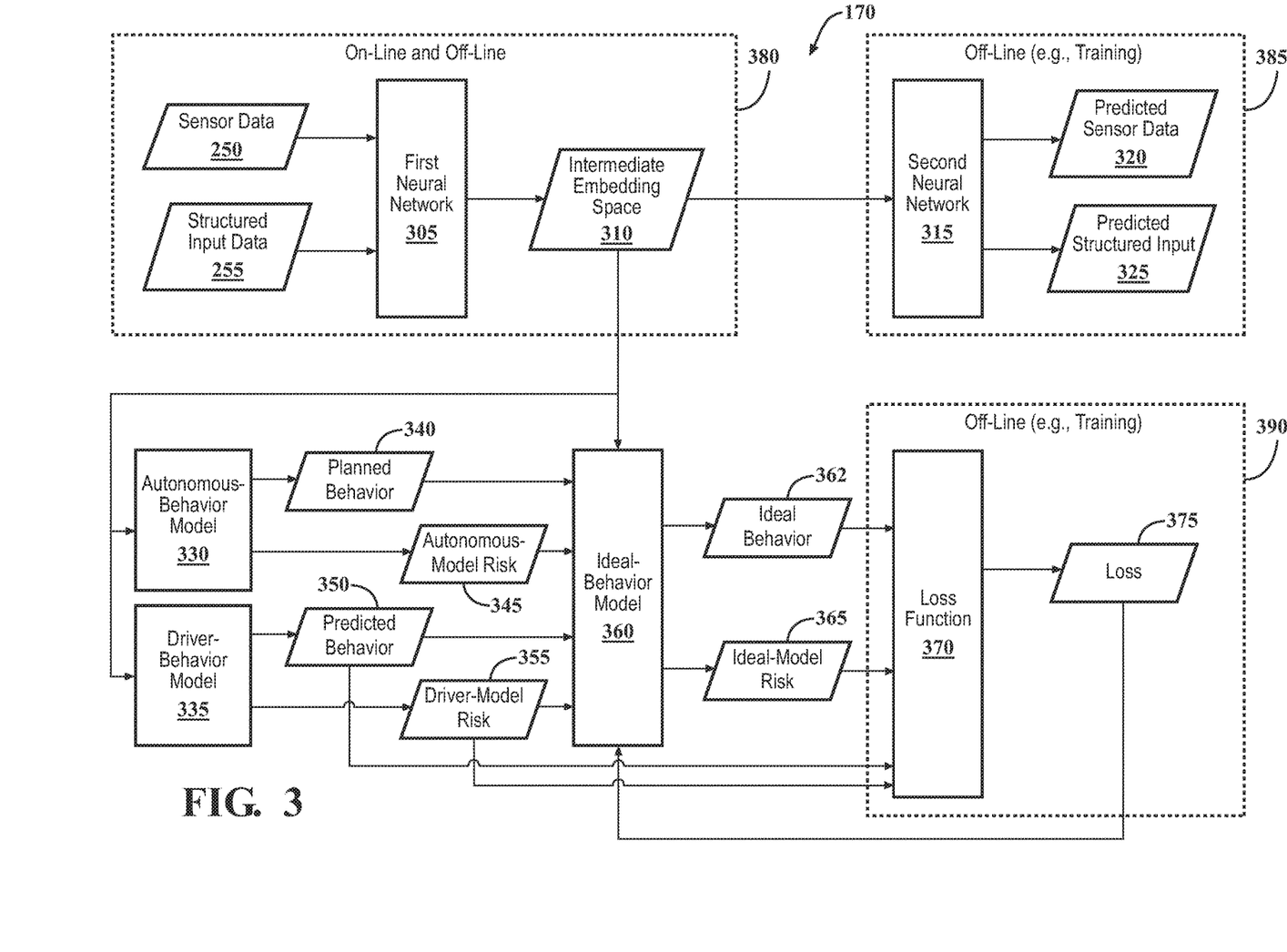
FIG. 3 is a functional block diagram of a parallel autonomy system for a vehicle, in accordance with an illustrative embodiment of the invention.

FIG. 3 is a functional block diagram of a parallel autonomy system 170 for a vehicle 100, in accordance with an illustrative embodiment of the invention. FIG. 3 diagrams how the various functions performed by the modules of parallel autonomy system 170 discussed above are interrelated. As shown in FIG. 3, first neural network 305 (an encoder network) receives input data including sensor data 250 and structured input data 255. First neural network 305 encodes the input data into an intermediate embedding space 310. As indicated in FIG. 3, the operations enclosed by box 380 can be performed both during an off-line training phase and during an on-line operational phase of parallel autonomy system 170.

As indicated in FIG. 3, the operations enclosed in box 385 are performed during an off-line training phase. During this training phase, intermediate embedding space 310 is input to second neural network 315 (a decoder network), which outputs predicted sensor data 320 and predicted structured input 325. As discussed above, training module 235 can jointly train the first neural network 305 (the encoder network) and the second neural network 315 (the decoder network) of an autoencoder, which may be a variational autoencoder, in some embodiments. A loss function may calculate a loss between the input data provided to the first neural network 305 (the encoder network) and the predicted inputs (320 and 325) generated by the second neural network 315 (the decoder network). This loss may then be used to train the first and second neural networks (305 and 315) such that subsequently calculated losses between the input data provided to the first neural network 305 and the predicted input data generated by the second neural network 315 decrease over time.

Intermediate embedding space 310 is also input to both autonomous-behavior model 330 (the first behavior model discussed above, in this embodiment) and driver-behavior model 335 (the second behavior model discussed above, in this embodiment). Autonomous-behavior model 330 outputs a planned behavior 340 and an associated autonomous-model risk 345. Driver-behavior model 335 outputs a predicted behavior 350 and an associated driver-model risk 355. Planned behavior 340, autonomous-model risk 345, predicted behavior 350, and driver-model risk 355 are input to ideal-behavior model 360, which outputs an ideal behavior 362 and an associated ideal-model risk 365. Control module 240 controls one or more aspects of the operation of vehicle 100 such as steering, acceleration, and/or braking based, at least in part, on the ideal behavior 362, as discussed above.

As indicated in FIG. 3, the operations enclosed in box 390 are performed during the off-line training phase. During that phase, ideal behavior 362 and ideal-model risk 365, as well as predicted behavior 350 and driver-model risk 355, are input to a loss function 370. In one embodiment, training module 235 minimizes the loss 375, as discussed above. The calculated loss may reflect a difference (or similarity) between the risk posed by carrying out the predicted behavior 350 and the ideal behavior 362. In other embodiments in which the first and second behavior models are both autonomous-behavior models, training module 235 can employ a loss function 370 in training the ideal-behavior model 360 to combine the two different planned behaviors in a manner that achieves predetermined optimization criteria for the output ideal behavior 362, as discussed above.

The functions diagrammed in FIG. 3, in some embodiments, can be performed repeatedly in real time. For example, in one embodiment, parallel autonomy system 170 processes image-sensor frames from camera(s) 126 at the rate of 30 frames per second and makes decisions based on the last ten frames.

Figure 4:
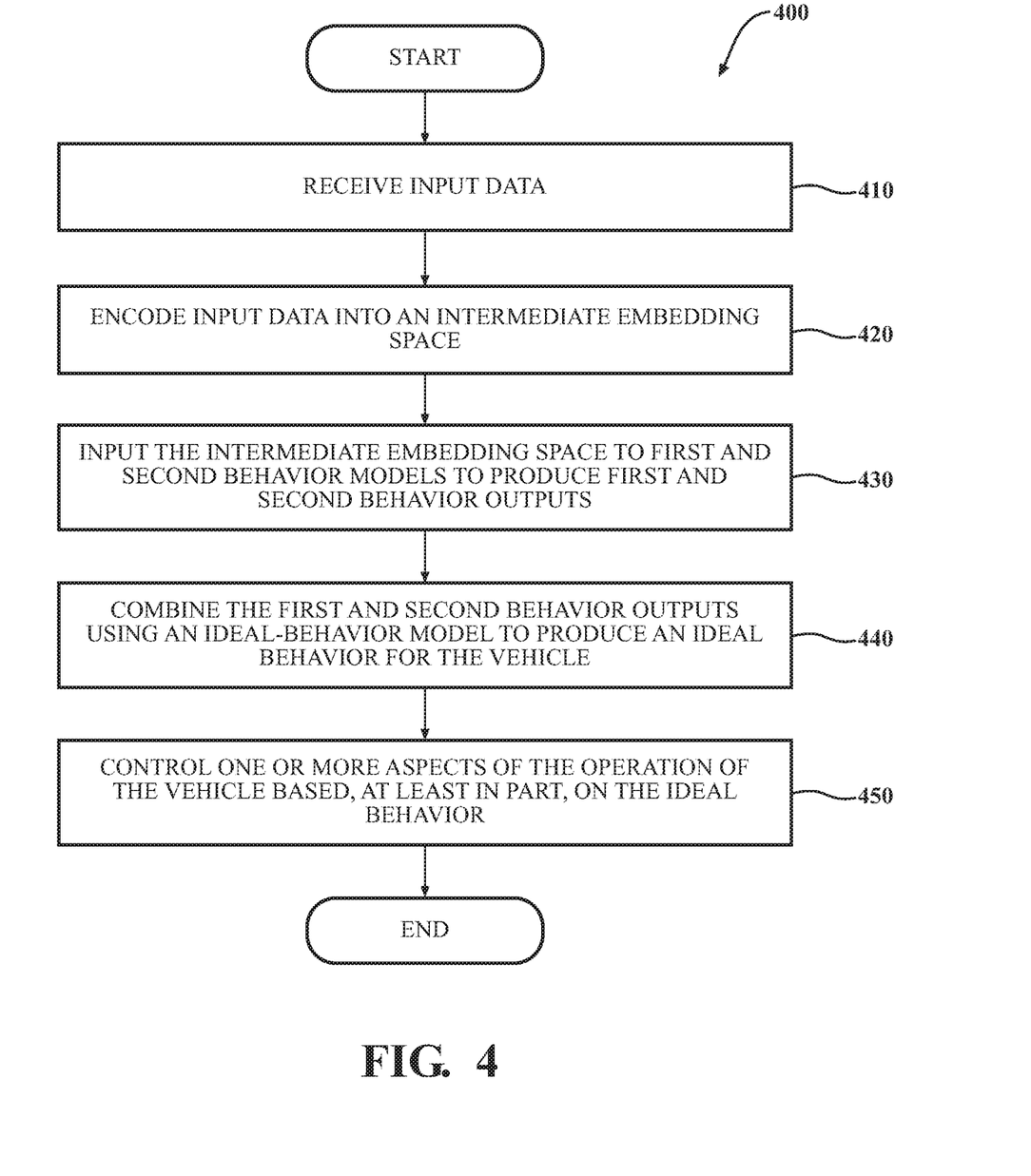
FIG. 4 is a flowchart of a method of parallel autonomy of a vehicle, in accordance with an illustrative embodiment of the invention.

FIG. 4 is a flowchart of a method 400 of parallel autonomy of a vehicle 100, in accordance with an illustrative embodiment of the invention. Method 400 will be discussed from the perspective of parallel autonomy system 170 in FIG. 2. While method 400 is discussed in combination with parallel autonomy system 170, it should be appreciated that method 400 is not limited to being implemented within parallel autonomy system 170, but parallel autonomy system 170 is instead one example of a system that may implement method 400. Note that some embodiments include additional actions that are not shown in FIG. 4. Those additional actions are discussed below after the discussion of FIG. 4.

At block 410, data encoding module 215 receives input data. As discussed above, the input data can include sensor data 250 from one or more sensors in sensor system 120, structured input data 255, or both. As discussed above, sensor data 250 can include one or more of image data from camera(s) 126, radar data from radar sensor(s) 123, and LIDAR point-cloud data from LIDAR sensor(s) 124. Structured input data 255 can include, for example, position data and trajectories for one or more road agents, information about the lane geometries of one or more roadways, and intermediate output data from a perception pipeline of vehicle 100. In some embodiments, parallel autonomy system 170 receives at least some structured input data 255 from sources external to vehicle 100. Those external sources can include, for example, cloud servers, infrastructure systems, and/or other vehicles (e.g., connected vehicles 180).

At block 420, data encoding module 215 encodes the input data into an intermediate embedding space 310 using a first neural network 305 (e.g., an encoder network in an autoencoder). As explained above, the intermediate embedding space 310 provides an efficient, low-dimensionality representation (e.g., vectors or two-dimensional matrices) of a large amount of input data analyzed by parallel autonomy system 170 in making decisions.

At block 430, the intermediate embedding space 310 is input to the first and second behavior models (e.g., 330 and 335, respectively, in the embodiment of FIG. 3) via, respectively, first behavior module 220 and second behavior module 225. The first behavior module 220 processes the intermediate embedding space 310 using a first behavior model to produce a first behavior output (e.g., planned behavior 340 in the embodiment of FIG. 3). The second behavior module 225 processes the intermediate embedding space 310 using a second behavior model to produce a second behavior output (e.g., predicted behavior 350 in the embodiment of FIG. 3). As discussed above, in some embodiments, the first behavior model is an autonomous-behavior model 330, and the first behavior output is a planned behavior 340 for vehicle 100 that can be executed autonomously via autonomous driving module(s) 160. In some embodiments, the second behavior model is a driver-behavior model 335 that predicts the future intended behavior (e.g., steering, acceleration, and/or braking maneuvers) of vehicle 100, as controlled by a human driver. In other embodiments, the second behavior model, like the first behavior model, is an autonomous-behavior model, and the second behavior output is a planned behavior for vehicle 100 that is different from that produced by the first behavior model, as discussed above.

At block 440, ideal-behavior module 230 combines the first behavior output and the second behavior output using an ideal-behavior model 360 to produce an ideal behavior 362 for vehicle 100. As discussed above, in some embodiments involving parallel (or shared) autonomy between an autonomous driving system (e.g., autonomous driving module(s) 160) and a human driver, ideal-behavior module 230 balances the following two factors that, at times, may conflict with each other: (1) An ideal behavior more similar to the driver's predicted (intended) behavior is more comfortable for the driver and is thus preferable to an ideal behavior less similar to the intended behavior; and (2) An ideal behavior posing a lesser risk of a traffic incident is preferable to an ideal behavior posing a greater risk of a traffic incident. As also discussed above, ideal-behavior module 230 can include a SVM (support vector machine), neural network, or a reinforcement-learning model, depending on the particular embodiment.

At block 450, control module 240 controls one or more aspects of the operation of a vehicle 100 based, at least in part, on the ideal behavior 362. As discussed above, the one or more aspects of the operation of vehicle 100 can include steering, acceleration, and/or braking.

In some embodiments, method 400 can include additional actions not shown in FIG. 4. These actions can include those associated with an off-line training phase, as discussed above in connection with training module 235 and the embodiment shown in FIG. 3. For example, the training phase can include inputting the intermediate embedding space 310 to a second neural network 315 that is a decoder network of an autoencoder and training the second neural network 315 to predict the input data fed to the first neural network 305 (the encoder network of the autoencoder). The training phase can also include training the ideal-behavior model 360 to combine the first behavior output and the second behavior output in a manner that minimizes a predetermined loss function. In some embodiments, during an on-line operation phase, ideal-behavior module 230 updates the ideal-behavior model 360 in accordance with feedback received from a human driver so that future fused ideal behaviors 362 are more pleasing to the human driver.

In some embodiments, method 400 also includes the outputting of a risk estimate associated with a planned behavior 340 (autonomous-model risk 345), the outputting of a risk estimate associated with a predicted behavior 350 (driver-model risk 355), and the outputting of a risk estimate associated with an ideal behavior 362 (ideal-model risk 365). These risks are processed as additional inputs to facilitate the decision making performed by parallel autonomy system 170.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with other road users (ORUs), or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-4, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ SMALLTALK®, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for parallel autonomy of a vehicle, the system comprising:
    one or more sensors;
    one or more processors; and
    a memory communicably coupled to the one or more processors and storing:
        a data encoding module including instructions that when executed by the one or more processors cause the one or more processors to:
            receive input data, the input data including at least one of sensor data from the one or more sensors and structured input data; and
            encode the input data into an intermediate embedding space using a first neural network, wherein the intermediate embedding space is an efficient, low-dimensionality representation of the input data;
        a first behavior module including instructions that when executed by the one or more processors cause the one or more processors to process the intermediate embedding space using a first behavior model to produce a first behavior output and a first risk estimate associated with the first behavior output;
        a second behavior module including instructions that when executed by the one or more processors cause the one or more processors to process the intermediate embedding space using a second behavior model to produce a second behavior output and a second risk estimate associated with the second behavior output;
        an ideal-behavior module including instructions that when executed by the one or more processors cause the one or more processors to combine the first behavior output and the second behavior output using an ideal-behavior model to produce an ideal behavior for the vehicle, wherein the ideal-behavior model considers the first risk estimate and the second risk estimate in producing the ideal behavior for the vehicle; and
        a control module including instructions that when executed by the one or more processors cause the one or more processors to control one or more aspects of operation of the vehicle based, at least in part, on the ideal behavior.

2. The system of claim 1, wherein the one or more sensors include one or more of an image sensor, a radar sensor, a Light Detection and Ranging (LIDAR) sensor, and a Controller-Area-Network (CAN) sensor.

3. The system of claim 1, wherein the structured input data includes at least one of (1) position data for at least one road agent, (2) lane geometries, and (3) image-segmentation data, and the data encoding module includes instructions to receive the structured input data from one or more of a perception pipeline of the vehicle and one or more sources external to the vehicle, the sources external to the vehicle including one or more of cloud servers, infrastructure systems, and other vehicles.

4. The system of claim 1, wherein the first neural network is an encoder network of an autoencoder.

5. The system of claim 4, further comprising a training module including instructions that when executed by the one or more processors cause the one or more processors to:
- input, during a training phase, the intermediate embedding space to a second neural network that is a decoder network of the autoencoder; and
- train the second neural network to predict the input data.

6. The system of claim 1, further comprising a training module including instructions that when executed by the one or more processors cause the one or more processors to train, during a training phase, the ideal-behavior model to combine the first behavior output and the second behavior output in a manner that minimizes a predetermined loss function and wherein the ideal-behavior module includes instructions to update, during an operational phase, the ideal-behavior model in accordance with driver feedback.

7. The system of claim 1, wherein:
- the first behavior model is an autonomous-behavior model for autonomous driving and the first behavior output is a planned behavior for the vehicle; and
- the second behavior model is a driver-behavior model and the second behavior output is a predicted behavior of the vehicle.

8. The system of claim 1, wherein the first behavior model and the second behavior model are both autonomous-behavior models and the first behavior output and the second behavior output are different planned behaviors for the vehicle.

9. The system of claim 1, wherein the ideal-behavior model includes at least one of a support vector machine, a regressive neural network, and a reinforcement-learning model.

10. The system of claim 1, wherein the one or more aspects of operation of the vehicle include at least one of steering, acceleration, and braking.

11. A non-transitory computer-readable medium for parallel autonomy of a vehicle and storing instructions that when executed by one or more processors cause the one or more processors to:
- receive input data, the input data including at least one of sensor data and structured input data;
- encode the input data into an intermediate embedding space using a first neural network, wherein the intermediate embedding space is an efficient, low-dimensionality representation of the input data;
- input the intermediate embedding space to a first behavior model and a second behavior model, the first behavior model producing a first behavior output and a first risk estimate associated with the first behavior output, the second behavior model producing a second behavior output and a second risk estimate associated with the second behavior output;
- combine, based at least in part on the first risk estimate and the second risk estimate, the first behavior output and the second behavior output using an ideal-behavior model to produce an ideal behavior for the vehicle; and
- control one or more aspects of operation of the vehicle based, at least in part, on the ideal behavior.

12. The non-transitory computer-readable medium of claim 11, wherein the first neural network is an encoder network of an autoencoder.

13. The non-transitory computer-readable medium of claim 12, further comprising instructions that when executed by the one or more processors cause the one or more processors to:
- input, during a training phase, the intermediate embedding space to a second neural network that is a decoder network of the autoencoder; and
- train the second neural network to predict the input data.

14. A method of parallel autonomy of a vehicle, the method comprising:
- receiving input data, the input data including at least one of sensor data and structured input data;
- encoding the input data into an intermediate embedding space using a first neural network, wherein the intermediate embedding space is an efficient, low-dimensionality representation of the input data;
- inputting the intermediate embedding space to a first behavior model and a second behavior model, the first behavior model producing a first behavior output and a first risk estimate associated with the first behavior output, the second behavior model producing a second behavior output and a second risk estimate associated with the second behavior output;
- combining, based at least in part on the first risk estimate and the second risk estimate, the first behavior output and the second behavior output using an ideal-behavior model to produce an ideal behavior for the vehicle; and
- controlling one or more aspects of operation of the vehicle based, at least in part, on the ideal behavior.

15. The method of claim 14, wherein the first neural network is an encoder network of an autoencoder.

16. The method of claim 15, further comprising:
- inputting, during a training phase, the intermediate embedding space to a second neural network that is a decoder network of the autoencoder; and
- training the second neural network to predict the input data.

17. The method of claim 14, wherein:
- the first behavior model is an autonomous-behavior model for autonomous driving and the first behavior output is a planned behavior for the vehicle; and
- the second behavior model is a driver-behavior model and the second behavior output is a predicted behavior of the vehicle.

18. The method of claim 14, wherein the first behavior model and the second behavior model are both autonomous-behavior models and the first behavior output and the second behavior output are different planned behaviors for the vehicle.

19. The method of claim 14, wherein the ideal-behavior model includes at least one of a support vector machine, a regressive neural network, and a reinforcement-learning model.

20. The method of claim 14, further comprising:
- training, during a training phase, the ideal-behavior model to combine the first behavior output and the second behavior output in a manner that minimizes a predetermined loss function; and
- updating, during an operational phase, the ideal-behavior model in accordance with driver feedback.

* * * * *